United States Patent [19]

Santos

[11] Patent Number: 4,669,584

[45] Date of Patent: Jun. 2, 1987

[54] INERTIA STOP FOR SUDDEN LOADS

[75] Inventor: Luis Santos, Surbiton, United Kingdom

[73] Assignee: Babcock Power Limited, London, England

[21] Appl. No.: 779,289

[22] PCT Filed: Jan. 28, 1985

[86] PCT No.: PCT/GB85/00039

§ 371 Date: Sep. 24, 1985

§ 102(e) Date: Sep. 24, 1985

[87] PCT Pub. No.: WO85/03335

PCT Pub. Date: Aug. 1, 1985

[30] Foreign Application Priority Data

Jan. 27, 1984 [GB] United Kingdom ................ 8402189

[51] Int. Cl.$^4$ ........................... F16F 3/16; F16F 3/20; F16F 9/32

[52] U.S. Cl. .................................... 188/134; 188/378; 248/636; 248/571; 267/8 D

[58] Field of Search ............... 248/571, 572, 636, 638; 188/134, 30, 31, 60, 67, 378–380, 129, 265, 381, 189, 180, 184; 267/8 D, 136, 170–179; 74/424.8, A 11, 89.15; 192/116.5, 103 R

[56] References Cited

U.S. PATENT DOCUMENTS

| 4,094,387 | 6/1978 | Pelat et al. ........................ 188/381 |
| 4,105,098 | 8/1978 | Klimaitis ....................... 188/134 X |
| 4,236,606 | 12/1980 | Sunakoda et al. .............. 188/134 X |
| 4,287,969 | 9/1981 | Misumi et al. ...................... 188/134 |

FOREIGN PATENT DOCUMENTS 2645579 4/1977 Fed. Rep. of Germany .
2517778 6/1983 France .

Primary Examiner—Douglas C. Butler
Attorney, Agent, or Firm—Solon B. Kemon

[57] ABSTRACT

An inertia stop by which excessive movement between two members may be prevented, includes a unit that may be fixed to one of the members and a further unit that includes a free component and a component that may be fixed to the other of the members, one component being in the form of an externally threaded shaft and the other component being in the form of an internally threaded block that is loosely rotatable on, relatively to, the shaft with the threads engaging so that the free component may rotate relatively to the other between a position in which it is dissociated from the first unit and a position in which is engages with the first unit so that further rotation in that direction is prevented. A resilient device is included in the stop to establish a separation between the free component and the other unit during acceptable relative movement of the members which will be overcome by the inertia of the free component relatively to the fixed movement of the members to an extent that permits the free component to come into contact with the other unit.

7 Claims, 5 Drawing Figures

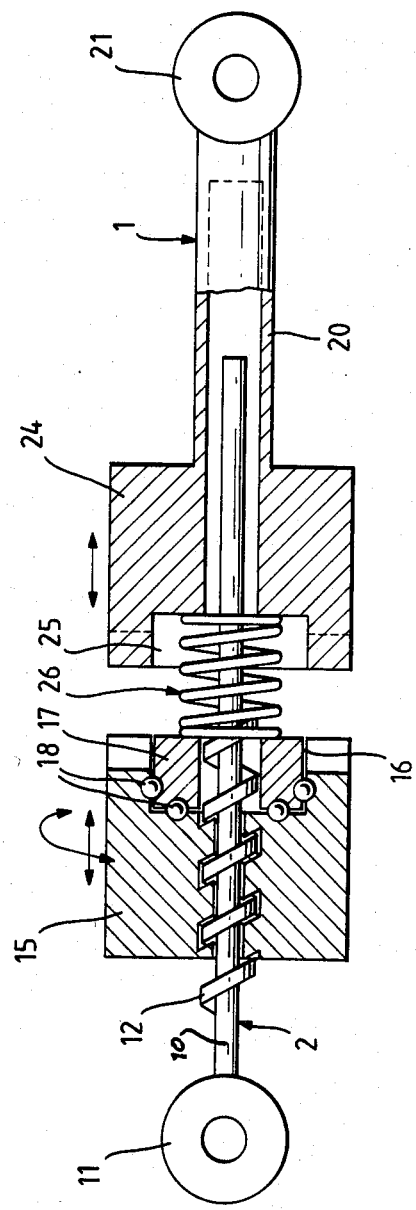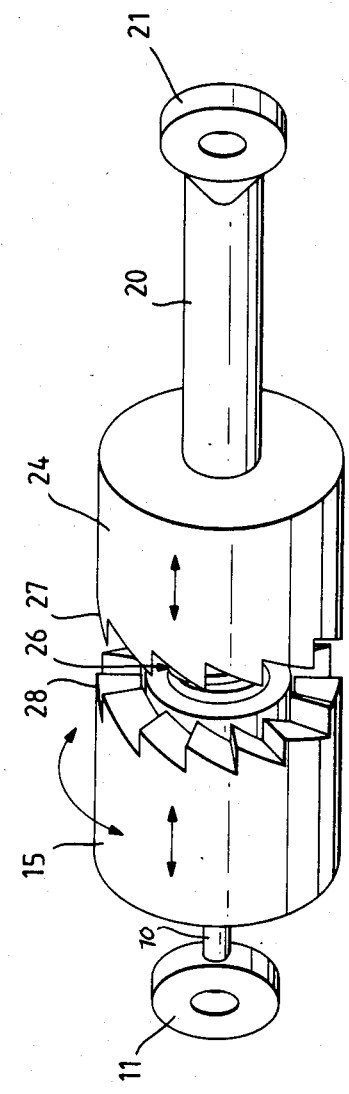

INERTIA STOP FOR SUDDEN LOADS

DESCRIPTION

In means by which pipe work is supported, it may be necessary to accommodate some movement in the pipe work as a result of variations in surrounding conditions. It may also be necessary, though, to ensure that sudden loads on the pipe work will not result in intolerable movement of the pipe work and the present invention arose from a consideration of the ways in which appropriate support might be achieved.

According to the present invention, there is provided an inertia stop by which excessive movement between two members may be prevented, comprising a unit that may be fixed to one of the members and a further unit that includes a free component and a component that may be fixed to the other of the members, one component being in the form of an externally threaded shaft and the other component being in the form of an internally threaded block that is loosely rotatable on, relatively to, the shaft with the threads engaging so that the free component may rotate relatively to the other between a position in which it is dissociated from the first unit and a position in which it engages with the first unit so that further rotation in that direction is prevented, resilient means being included in the stop to establish a separation between the free component and the other unit during acceptable relative movement of the members but that will be overcome by the inertia of the free component relatively to the fixed component resulting from an unacceptable relative movement of the members to an extent that permits the free component to come into contact with the other unit.

By way of example an embodiment of the invention will now be described with reference to the accompanying drawings in which:

FIG. 1 shows in axial section an inertia stop by which the excessive movement of a pipe or other component, laterally towards a support may be prevented;

FIG. 2 is perspective view of the stop that is shown in section in FIG. 1;

Figure 3:
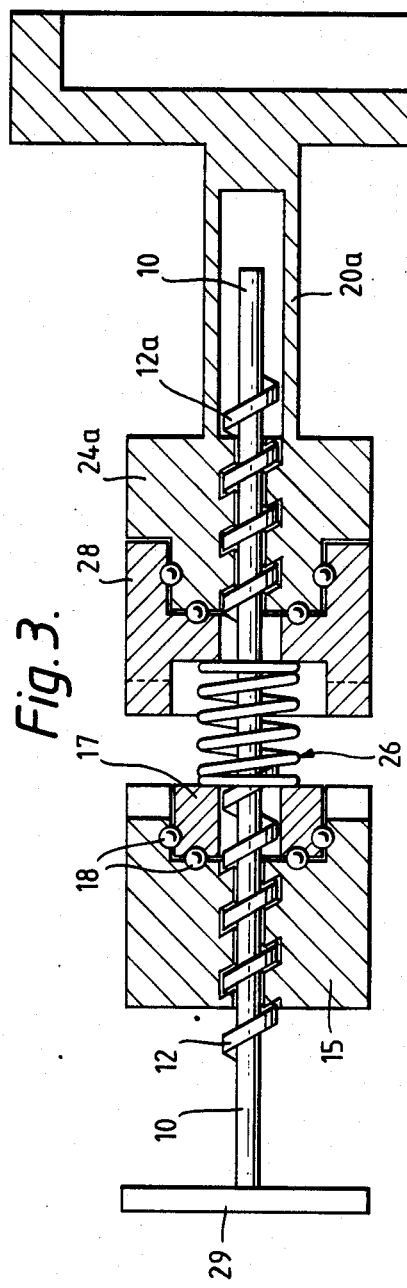
Figure 4:
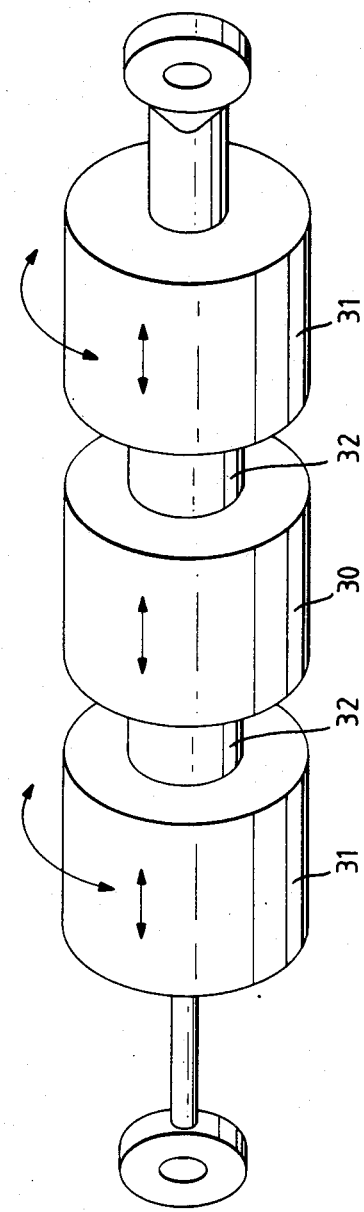
Figure 5:
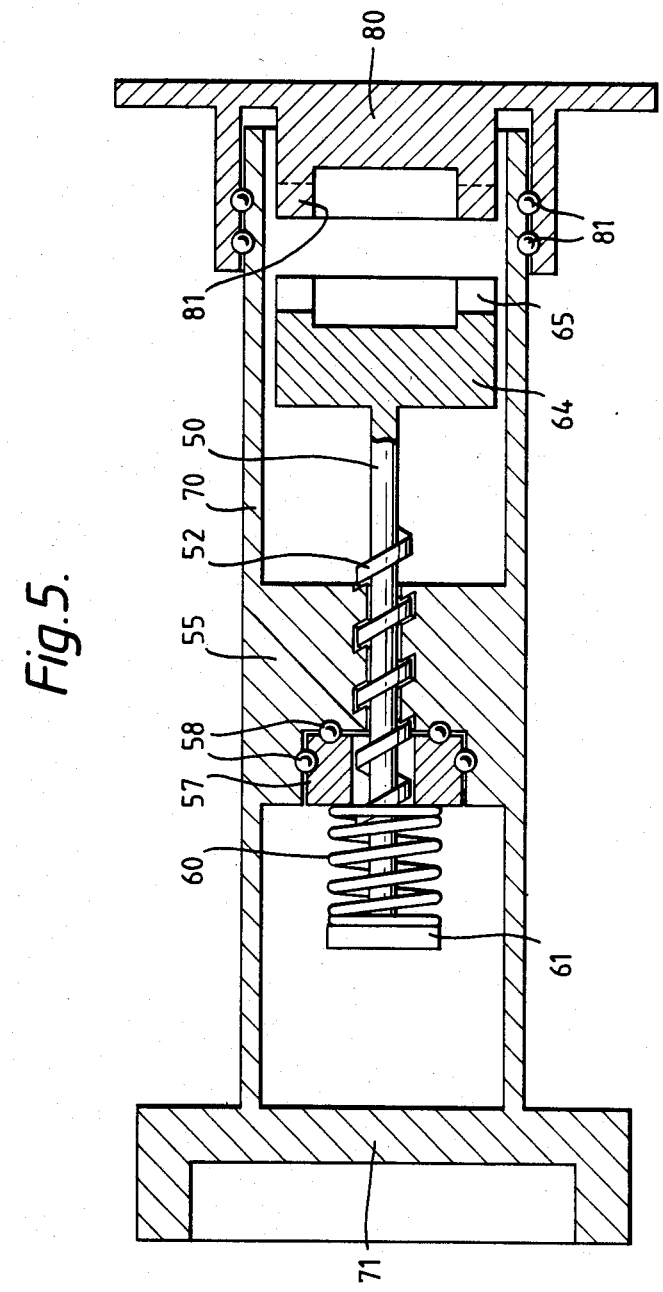

FIG. 3 shows in axial section a modification of what is shown in FIG. 1 so that excessive rotation of a component relatively to a support may be prevented FIG. 4 shows schematically an inertia stop that can be operated by sudden movement of a pipe or other component either towards or away from a support; and FIG. 5 shows in axial section another embodiment of the invention by which sudden axial rotation of a component relatively to a support may be inhibited.

The stop shown in FIG. 1 includes a first unit 1 and a further unit 2.

The further unit 2 includes, as one component, a shaft 10 provided at one end with means 11 by which it may be fixed to a pipe or other component that is to be supported. The end of the shaft 10 remote from the means 11 is smooth for about half the length of the shaft whilst between the smooth part and the means 11 it is provided with an external thread 12 of high constant pitch. This thread 12 may be envisaged as a parallel sided strip wound round, and fixed to, the shaft rather than being of more usual V-shaped cross-section.

The unit 12 includes a section component that comprises a massive circular block 15 internally threaded so that it can rotate easily and loosely on the threaded part of the shaft 10. At the end remote from the means 11, the block 15 is provided with a central recess 16 that contains an inset 17 mounted on balls 18 so that it can revolve freely within the block 15.

The first unit 1, which serves as an anchor means, comprises essentially a hollow tube 20 having means 21 at one end by which it may be connected to a fixed support. The end of the tube 20 remote from the means 21 receives the smooth end of the shaft 10. The end that receives the shaft is provided with a cylindrical enlargement 24 having, at its outer end, a recess 25. A helical spring 26 lies co-axially around the shaft 10 and is fixed at one end within the recess 25 and at other end to the inset 17. The length of the spring 26 is such as normally to maintain a small maximum spacing between the block 15 and the enlargement 24.

As is shown clearly in FIG. 2, the part of the enlargement 24 that surrounds the recess 25 is shaped to provide a ring of teeth 27. A ring of similar teeth 28 is provided on the facing end of the block 15, around the inset 17. Each tooth has one side that is parallel to the axis of the shaft 10 and one other side that slopes from the outer end of one tooth to the inner end of the next. The teeth are such that by winding the block 15 along the shaft 10 with the anchor means, unit 1, stationary, the rings of teeth may be brought into mesh with each other and the disposition of the teeth is such that such movement brings the straight sides of the teeth of one ring into abutment with the straight sides of the teeth of the other ring.

Now suppose that the stop that has been described is fixed by the means 11 to a pipe and by the means 21 to a fixed support and that in use the pipe moves slowly towards the fixed support. The anchor means, i.e. that unit 1, will move along the shaft 10 and the spring 16, becoming slightly compressed, will cause the block 15 to roll, guided by the threads 12, along the shaft 10 in correspondence with the movement of the pipe. Suppose, then, that the pipe tends to move more violently towards the fixed support. The sudden movement will not be reflected in a sudden movement of the block 15, which will react more slowly due to its inertia, with the result that the anchor means will move, relatively, towards the block 15, compressing the spring 26. If the sudden movement is large enough, the spring will be compressed sufficiently for the rings of teeth 27 and 28 to engage each other so that further relative movement between the units is prevented and the pipe is held against further movement.

When the forces tending to compress the spring 26 have been released, it will expand to establish the normal separation between the block 15 and the unit 1. If the pipe moves further in the opposite sense to that which effected compression the spring will draw the block along the shaft in that direction.

The stop that has been described, which was intended to inhibit excessive lateral movement of a pipe relatively to a support, may be modified to provide a support against excessive rotation of one component relatively to a support. The modification consists of providing threads 12a on the part of the shaft 10 that, in the previous embodiment, was not threaded and providing the bore in the tube 20a with co-operating threads. The additional threads 12a may be of the same, or a different, pitch and angle as those previously mentioned. The cylindrical enlargement 24a carries a cap 28 mounted on it by means of balls so that the cap 28 can rotate easily relatively to the enlargement 14a. Spring 26 is connected to the cap 28 rather than to the enlargement 14a and the end of the cap 28 that faces the teeth on the block 15 is provided with co-operating teeth.

If the rotation of a component connected to the end 29 of shaft 10 is slow, then the relative rotation between the anchor means and the shaft is slow and the block 15 will correspondingly rotate along the shaft 10 to permit such movement. If, however, there is a sudden tendency to rotation, the shaft will be screwed more quickly relatively to the anchor means by the sudden movement, but the change in movement will not be reflected in a sudden movement of the block 15 along the shaft 10 which will react more slowly due to its inertia, with the result that the block and the anchor means will move relatively towards each other until the spring 26 is sufficiently compressed for the teeth to engage and prevent further relative movement.

The somewhat schematic illustration in FIG. 4 illustrates a modification of what is shown in FIG. 1 allowing locking of the inertia stop to be effected in either sense—by compression or tension. In this, there is a single translational unit 30, comparable to the unit 1 of FIG. 1, between two rotational units 31, comparable to the block 15 and the threads 12 of FIG. 1, with springs 32 interposed between each unit 31 and the unit 30.

The embodiment shown in FIG. 5 is also intended to inhibit sudden and excessive rotational movements.

A shaft 50, threaded at 52 extends through a block 55 that is internally threaded to co-operate with the threads 52. An inset 57 is let into one end (the end opposite to that in which the inset is shown in FIG. 1) of the block 55 and is rotatable therein on balls 58. A spring 60 extends between the inset 57 and a flange 61 at the adjacent end of the shaft 50.

The end of the shaft 50 remote from the flange 61 is provided with a massive buffer 64 at the end of which is a ring of teeth 65 similar to the ring of teeth 28.

The block 55 is integral and concentric with, and about mid-way along, a tube 70. The end of the tube 70 nearest the flange 61 is provided with means 71 that can be connected to the component in which only moderate rotation is to be allowed. The other end of the tube 70 extends beyond the buffer 65 and is received in a fixed support 80 acting as anchor means and providing balls 81 that locate, but permit rotation of, the end of the tube 70.

Concentric with the tube 70, the support 80 provides a ring of teeth 81 which can engage, in the manner described with reference to FIGS. 1 and 2, with the teeth 65.

If the tube 70 (and the component that the device is to protect) rotates at a slow speed, then the shaft 50 rotates with it. Should the speed increase, however, the inertia of the shaft 50, and the buffer 64 that it carries, will tend to prevent its rotation so that the effect of the engagement of the thread 52 on the shaft 50 with the thread in the block 55 will cause the shaft 50 to move relatively to the block 55 towards the fixed support 80. Engagement with that will prevent further axial movement of the shaft 50 and prevent rotational movement of the tube 70.

It will be realised that the stops that have been described will permit slow movement of whatever is connected to the anchor means but provide restraint against excessive movement that would result from sudden loads. They may be produced cheaply and are not cumbersome or greedy of space. Moreover, once the excessive load has been removed, so too is the locking effect. The load that the stop can accept before locking takes place is dependent upon the inertia of the block and the anchor means, the angle and pitch of the threads on the shaft, the stiffness of the spring, and the normal gap between the block and the anchor means. The depth and pitch of the teeth that engage as the block and anchor means approach each other may also be varied.

Whilst the use of the devices that have been described has been related to the positioning of a pipe, they may be more generally used in the restraining of loads resulting from safety/relief valve blow, pipe whip, wind loading, conventional support failure, and other situations in the conventional and nuclear power industries, perochemical, petroleum and other industries.

I claim:

1. An inertia stop by which excessive movement between two members may be prevented, comprising a unit that may be fixed to one of the members and a further unit that includes a free component and a component that may be fixed to the other of the members, one component being in the form of an externally threaded shaft and the other component being in the form of an internally threaded block that is loosely rotatable on, relatively to, the shaft with the threads engaging so that the free component may rotate relatively to the other between a position in which it is dissociated from the first unit and a position in which it engages with the first unit, each unit being provided with a ring of teeth that encircles the axis of the shaft and which are such as to engage when the latter position is reached so that further rotation in that direction is prevented, and resilient means being included in the stop to establish a separation between the free component and the other unit during acceptable relative movement of the members but that will be overcome by the change in inertia of the free component relatively to the fixed component resulting fron an unacceptable relative movement of the members to an extent that permits the rings of teeth to come into engagement.

2. An inertia stop as claimed in claim 1 in which each of the teeth associated with the first unit has a side that is parallel to the axis and a second side that inclines from an end of the first side of one tooth to the other end of the first side of the next tooth, the teeth of the other ring are similar and such that, when the rings of teeth engage, the first sides of the teeth of one ring abut the first sides of the teeth of the other ring.

3. An inertia stop as claimed in claim 1 in which it is the shaft that may be fixed relatively to one of the members and the other unit may move relatively to the shaft only with a reciprocating motion.

4. An inertia stop as claimed in claim 3 in which the resilient means is a helical spring encircling the shaft, one end of the spring is fixed to the other unit and the other end of the spring is connected to an inset set into the block that may rotate on the shaft and relatively to which the block can rotate on balls.

5. An inertia stop as claimed in claim 1 in which it is the shaft that may be fixed relatively to one of the members and the other unit may move rotationally along the shaft by engagement with threads on the shaft.

6. As inertia stop as claimed in claim 5 in which the resilient means is a helical spring encircling the shaft and the spring is fixed at one end to an insert set into said other unit relatively to which the other unit can rotate on balls, the spring being fixed at the other end to an insert set into the block and relatively to which the block can rotate on balls.

7. An inertia stop as claimed in claim 1 in which the block is fixed within a tube that is coaxial with the shaft, one end of the tube is fixed to one of the members, and the other end of the tube is mounted to rotate within the other unit, the shaft extends from both ends of the block and the resilient means is in the form of a helical spring that extends around the end of the shaft remote from the other unit, the spring being connected to one end to the shaft and at the other end to an inset set into the block relatively to which the block can rotate on balls.

* * * * *